United States Patent [19]
Lawrence

[11] Patent Number: 5,493,785
[45] Date of Patent: Feb. 27, 1996

[54] ROTARY GRASS CUTTING HEAD

[76] Inventor: Elbert Lawrence, 202 River Oaks Dr., West Monroe, La. 71291

[21] Appl. No.: 354,244

[22] Filed: Dec. 12, 1994

[51] Int. Cl.$^6$ .................................................. B26B 25/00
[52] U.S. Cl. ................................................ 30/347; 30/276
[58] Field of Search ...................... 30/276, 347; 56/12.6, 56/255, 256, 295, DIG. 17; 172/15

[56] References Cited

U.S. PATENT DOCUMENTS

| | | |
|---|---|---|
| 2,888,993 | 6/1959 | Dunning . |
| 3,684,027 | 8/1972 | Crawford . |
| 3,684,028 | 8/1972 | Crawford . |
| 3,900,071 | 8/1975 | Crawford . |
| 4,756,146 | 7/1988 | Rouse ........................................ 30/276 |
| 5,430,943 | 7/1995 | Lee ........................................ 30/276 X |

*Primary Examiner*—Douglas D. Watts
*Attorney, Agent, or Firm*—Laurence R. Brown

[57] ABSTRACT

A heavy-duty, long-life, light-weight, replaceable rotary cutter head accessory for attachment to a rotary member of a vegetation trimmer is provided by this invention. The invention is characterized by several novel construction features that give the head superior cutting performance. For example, its construction is of two cylindrical coaxially nested cup-like head members with several sets of symmetrical apertures about the rim for retaining extending cutter members. The head members are constructed of light weight and extremely durable plastic, namely ultra high molecular weight polyethylene which has long wearing qualities. With apertures located in the two separate rim members, the head may be adapted for either flexible cord or rigid cutting members. The rigid cutting members are 16 or 20 penny nails, which wear a long time before encountering excessive wear in the special plastic head members. The nail heads are anchored between the rims of the two members, which are mounted by a bolt through a coaxial aperture in the respective cups. The assembly is easily removed to replace damaged nails or to relocate nails in new unworn apertures after long service intervals. Flexible cord cutter pairs are inserted through apertures in the inner cup rim which extends beyond the outer cup rim, placed for easily changing without unfastening the nested cup-shaped head members. By using two short lengths of cord mounted symmetrically dispersed about the head, less cord is used and higher speed cutting is an advantage over conventional longer cords. Dual cutter members of this head efficiently and effectively cut and trim both ordinary grass and heavier vegetation.

11 Claims, 2 Drawing Sheets

ROTARY GRASS CUTTING HEAD

TECHNICAL FIELD

This invention relates to lawn cutters and trimmers, and more particularly it relates to rotary cutter blade trimmers having either flexible cord or rigid steel cutting members.

BACKGROUND ART

Rotary grass cutters, edgers and trimmers are long known in the art using both flexible cord and rigid steel cutting members. It is convenient and inexpensive to use common steel nails for cutting blades as evidenced by the following U.S. Patents:

In U.S. Pat. No. 2,888,993 for Lawn Edger, Jun. 2, 1959, M. W. Dunning inserts a set of six nails into apertures of a rubber ring clamped between a pair of metal disks upon a rotary drive shaft. This has the deficiencies of heavy weight metal construction and the rapid deterioration and wear of rubber under encountered cutting conditions, particularly when vegetation heavier than ordinary lawn grass is to be cut thus introducing high stresses.

In U.S. Pat. Nos. 3,684,027 and 3,684,028 for Grass Edger, Aug. 15, 1972 and U.S. Pat. No. 3,900,071 for Plate Type Nail Holder for Edgers, Trimmers, or Other Applications, Aug. 19, 1975, H. H. Crawford disposes three nails with heads individually arranged and nested in open ended hollow steel cylindrical bosses located on a rotatable plate to be retained in place by a spring biased metal cover plate. Not only is this head heavy but particularly under the stresses of heavy industrial cutting the spring biassed retention plate is subject to chatter and malfunction with loss of and damage to the nail cutter arms.

Such prior art further has the disadvantage of wear and tear and catastrophic damage that is particularly encountered with the use of inflexibly held nail cutter arms that could encounter boards, sidewalk edges and the like in use causing enough damage to expensive head construction features that the heads must be replaced frequently.

Furthermore these rotary heads are not adapted for general purpose use of a single mower head for both ordinary grass that is relatively tender and heavier vegetation including weed stems. For example, flexible cord, typically plastic, is not effective for cutting the heavier vegetation. And furthermore the weight of the nails and rigid steel mounting structure is great enough to limit rotor speed at a given power, thus reducing cutting efficiency.

In general therefore, the prior art has failed to correct the aforesaid deficiencies and has not produced a versatile, lightweight, low-cost, long-lasting, high-speed cutter head that rapidly covers large cutting areas to provide improved performance in the presence of both grass and heavier vegetation.

It is accordingly an objective of this invention to provide an improved rotary cutter head that corrects the foregoing problems of the prior art. Other objectives, features and advantages of this invention will be found throughout the following description, claims and the accompanying drawings.

DISCLOSURE OF THE INVENTION

A low-cost, high-performance rotary mower head accessory is afforded by this invention that uses either flexible cord or rigid steel cutter members with their attendant advantages in cutting both grass and heavier vegetation. Superior cutting effectiveness and long wear is achieved by the plastic head construction from light-weight ultra high molecular weight polyethylene which affords higher rotary speeds and durability in retaining replaceable steel cutter blade members.

Sets, preferably two diametrically opposed, rigid metal cutting blade members preferably comprise 16 or 20 penny nails protruding outwardly through symmetrically spaced apertures. The nail heads are retained between the walls of two remountable concentrically nested cup-like cylindrical head members. Similar two flexible cord cutting members protrude outwardly from the rims of the nested head members. The nested cup cutter head members are held onto a rotary drive mechanism by a bolt extending through coaxially positioned mounting apertures in the respective head members.

A number of sets of paired cutter member apertures are distributed about the rims of the respective nested members. Typically six sets of two diametrically opposed cutter members in a set of twelve holes are distributed at 30 degree intervals about the circumference of the cup-like head members. Thus, when one set of apertures becomes worn by pressure and friction of the nail after many hours of cutting, the nails may simply be moved to or replaced into a different set of apertures, thereby affording a very long life before the head need be replaced and low cost cutter blades.

Other features of the invention will become evident from viewing the accompanying drawings.

BRIEF DESCRIPTION OF THE DRAWINGS

In the drawings, wherein similar reference characters identify similar features throughout the several views to facilitate comparison.

THE PREFERRED EMBODIMENT

Figure 1:
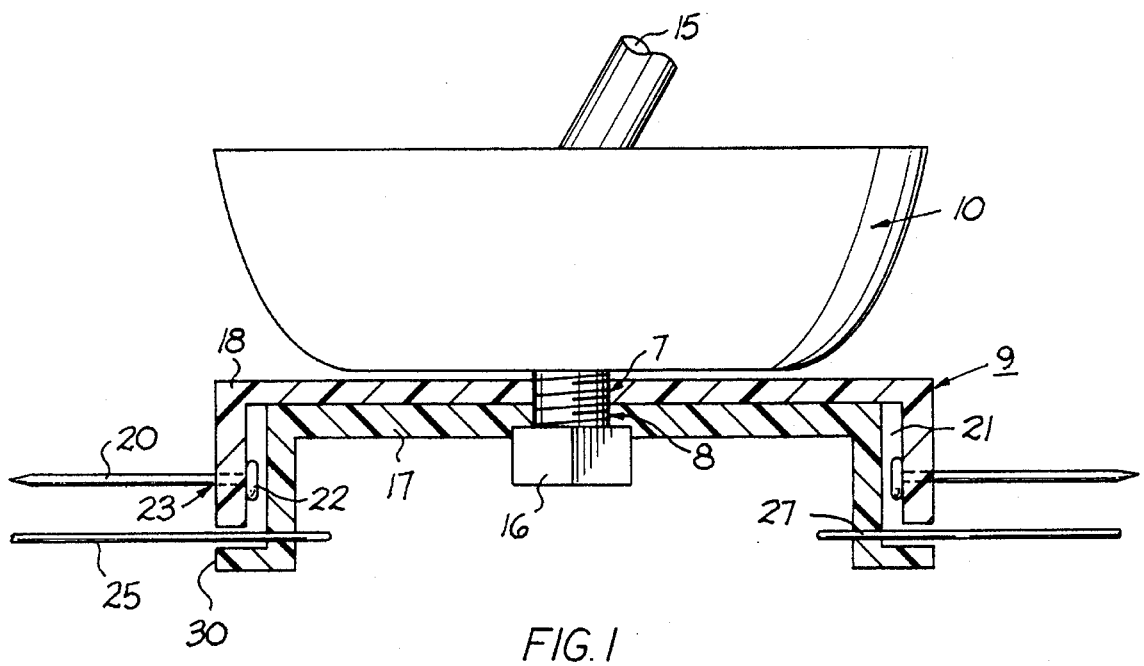
FIG. 1 is a side view sketch, partly in section, of a rotary trimmer drive mechanism carrying a rotary cutter head accessory embodying the invention.

A cutter head accessory embodiment 9 for a rotary edger or trimmer head 10 having a rotary power driving shaft 15, is shown in FIG. 1. The two cutter head members 17 and 18 are removably bolted in place by bolt 16 to rotate with the powered trimmer head 10. The respective coaxial mounting holes 7, 8 reside in the cup-like cylindrical respective inner and outer nested cutter head members 17, 18. The bolt 16 thus secures the inner 17, and outer 18 cutting head members coaxially in place on the powered trimmer head 10 to rotate as a unit.

Two rigid nail cutter members 20 are supported with their nail heads 22 disposed respectively in slots 21 indented in two diametrically opposite positions in the outer periphery of the inner cylindrical cutter head member 17. Two nails thus pass through one set of apertures 23, diametrically opposed, as selected from six such sets formed by pairs thus comprising the twelve apertures 23 spaced at thirty degree intervals about the rim of the outer cutter head member 18.

Figure 2:
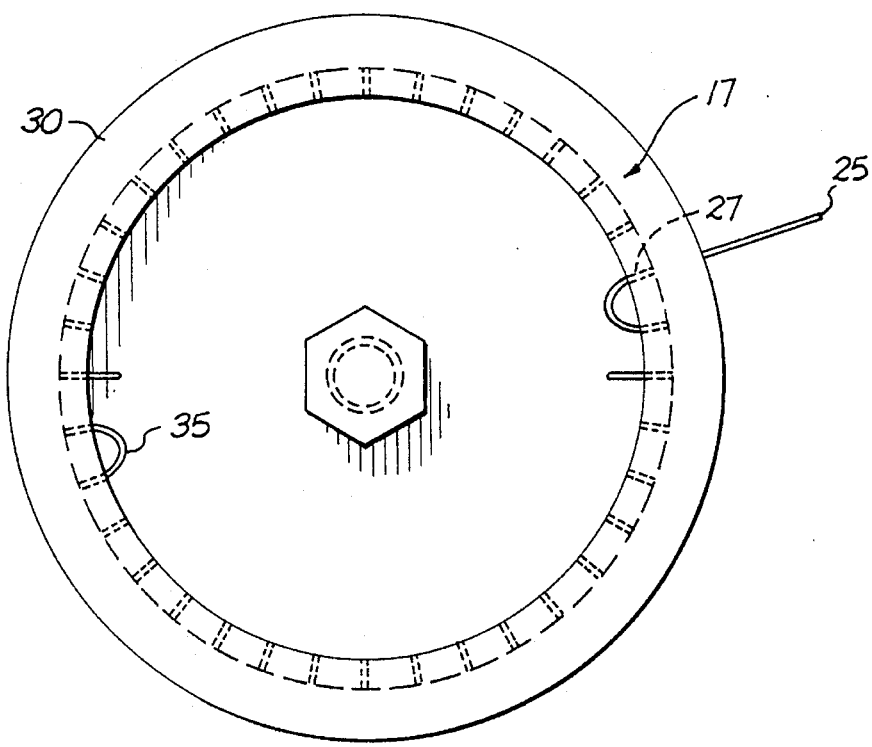
FIG. 2 is a bottom view of the two piece rotary cutter head.

In the inner nested cutter head member 17, two flexible cord cutter members 25 are passed through and extend from diametrically opposite ones of the thirty two apertures 27 to extend outwardly through the gap 28 between the two cutter head members 17, 18. The inner cutter head flange 30 keeps the cord 25 from striking the ground during rotation. These cutter cords 25 are retained in place by a zig-zag anchor end array 35 threaded through three adjacent holes 27, as better seen in FIG. 2.

This flexible cord cutter arrangement departs from the conventional cord cutters wherein a long single piece of cord, typically sixteen inches long, extends from the cutter head rim. By employing a pair of cords about four inches long extending about three and one-half inches from the head rim, a savings of about one-third of the string alone results from this embodiment, and superior cutting occurs from the dual cutter members. For example, the cords of the two cord sets more frequently pass a cutting zone than a single cord to improve cutting speed.

It is significant that the head cutter members 17, 18 are made of ultra high molecular weight (UHMW) polyethylene, which is light, tough and durable. Thus, the head weight is less than half of the weight of a metal head, thereby affording both the dynamic advantages in operation and the transport advantages most important in a hand manipulated tool of less weight. This construction gives better handling and maneuverability because there is less gyro effect with the reduced weight of the rotating mass in a hand-held trimmer-edger, for example. This UHMW polyethylene is commercially available and is sold under brand name "DUALITE" for example. The typical weight of the cutter head assembly described herein is approximately eight ounces. This light weight provides for faster rotation of the cutter head assembly 9 from the power source at shaft 15, and thus more effective cutting from the same source power than heavier heads such as steel.

It has been found that after many, many hours of use of an UHMW head, the holes 23 that the nails are located in may become worn. However the head is retained for further use. By locating twelve holes about the circumference of the outer nested cutter member 18, the head may be effectively renewed six times by the relative rotations of the two nested members 18 to align the respective sets of nail head holes 23 in outer nested cutter member 18 with the pair of nail head recesses 21 in the inner nested cutter member 17.

This renewal feature permits removal of the cutter head assembly 9 by means of bolt 16 to replace the nails 20 and relatively circumferentially adjust the two nested cutter head members 17 and 18 to mate a new pair of nail head holes 23 with the nail head recesses 21. Thus, the useful life of the cutter head assembly 9 is substantially increased. If conventional types of plastic heads were to be used, steel eyelets would have to be inserted to produce the improved durability and wear achievable with the UHMW polyethylene head. When the outer cutter head member 18 eventually needs replacement, the inner cutter head member 17 may be retained to provide very low cost maintenance.

The cord cutter members 25 threaded through the apertures 27 in the inner cutter head member 17 are replaceable without removing bolt 16 and the cutter head assembly 9. Also, the wear of the cord on the apertures 27 is not as great as the wear of the nails, so these head members 17 have a very long life, which is extended significantly by the ability to locate the sets of two working cords 25 in different diametrically opposite pairs of holes 27 about the rim of the head member 17. Pairs of shorter cords result in both savings of cord and more effective cutting over single longer cords conventionally in use. There is less length expendable in the anchoring portions of the cord which are discarded after wear with the two short cord cutter members. With two cords 25 or nails 20 cutting, the frequency of the encountering of vegetation by a cutter blade is greater thereby permitting faster progression of the cutting head. The cord cutter members 25 are used for lighter vegetation and the nails 20 for heavier vegetation.

Either sixteen or twenty penny nails may be inserted in the $7/_{32}$ inch diameter apertures in the rim of the outer nested cutter member 17. New nails may be inserted when they become bent from wear, much oftener than the need to replace the hole sets from wear of the plastic rim because of the UHMW polyethylene. Thus, this plastic head is compatible with the low cost nail cutter blades universally available from local hardware and building supply stores. The points on the ends of the nails make ideal cutter edges, and the cutting takes place essentially at these points which first encounter the vegetation and move at a higher speed near the outer peripheral reach of the cutter head assembly 9.

Figure 3:
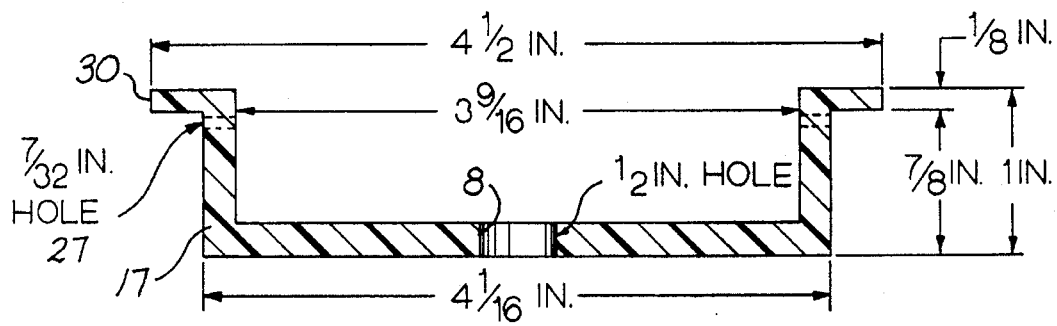
FIG. 3 is a side view, in section, of an inner head member, substantially cylindrical in shape, with preferred dimensions shown.
Figure 4:
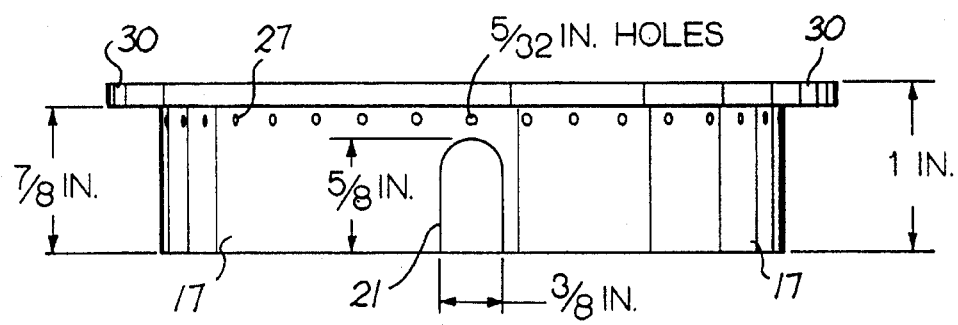
FIG. 4 is a side view of the inner head member, with preferred dimensions shown.
Figure 5:
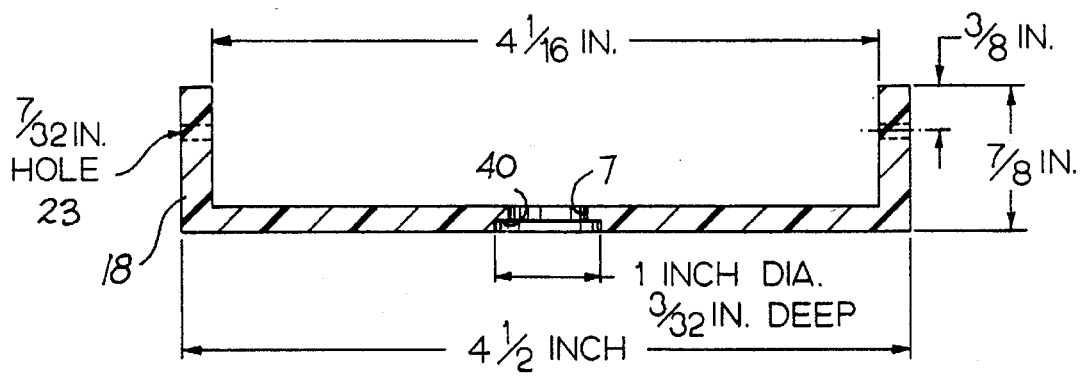
FIG. 5 is a side view, in section of an outer head member, with preferred dimensions shown for nesting thereinto the inner head member.

Proper dimensioning of the nesting cutter heads 17, 18 in a preferred size embodiment of the invention is set out in FIGS. 3, 4 and 5. Note that the coaxial aperture 7 of the outer cutter head member 18 has an outermost recessed one-inch diameter collar 40 adapted to fit on conventional commercial models of rotating head assemblies 10.

Having therefore improved the state of the art with the features and operational advantages of this invention, those novel features describing the spirit and nature of the invention are set forth with particularity in the following claims.

I claim:

1. A rotary cutter head accessory, comprising in combination:

a first outer cylindrical cup rotary cutter head member, a further inner cylindrical cup shaped rotary head cutter member nested coaxially within the outer cup, a rotating drive mechanism for rotating the nested cutter head members, each rotary cutter head member having a cylindrical rim portion and a closed bottom with an axial aperture therethrough for attaching and aligning the nested head members for rotation onto the rotating drive member, said nested members interfitting snugly and concentrically as adjacent inner and outer members, and being replaceably mountable upon the rotating drive member by a bolt extending coaxially through the apertures in the bottoms of the nested cups to form a rotary trimmer head attachment rotatable by said a rotary drive mechanism, at least one set of cutter apertures placed in a symmetrical pattern through the rim of at least one of the two head members, and at least one set of cutter members retained in a symmetrical pattern in said at least one set of cutter apertures to extend outwardly from the rim for cutting vegetation.

2. The cutter head of claim 1 wherein said cutter members comprise iron nails having a head retaining the nails in said apertures through the rim and said cutter apertures further comprise apertures through the outer head member rim with an adjacent cutout nest for receiving and supporting the cutting nail heads disposed between the nested head members.

3. The trimmer head of claim 1 wherein said cutter apertures further comprise a plurality of diametrically opposed sets of two apertures spaced about at least one said cutter member rim.

4. The trimmer head of claim 1 wherein said head members constitute light-weight ultra high molecular weight polyethylene.

5. The trimmer head of claim 1 wherein an innermost of the nested head members has a rim extending outwardly beyond the rim of an outermost nested head rim member and contains said at least one set of cutter apertures, and further comprising, anchor means for attaching lengths of cord to extend from the apertures in the innermost head member, wherein said set of cutter members further comprises at least two symmetrically positioned lengths of cord anchored in the innermost head member.

6. The trimmer head of claim 5 wherein approximately four and one-half inch lengths of cord are anchored through holes in the rim of a nested head to extend outwardly approximately three and one-half inches from the head member apertures.

7. The trimmer head of claim 5 wherein the anchor means for attaching lengths of cord comprise a set of anchoring apertures through the inner head member and an inner end of the length of cord is zig-zagged through the anchoring apertures for anchoring in place.

8. The trimmer head of claim 1 wherein said at least one set of cutter apertures further comprises separate sets of cutter apertures in the inner and outer nested head members, and wherein said at least one set of cutter members comprise optional sets of rigid cutter members and flexible cutter members.

9. The trimmer head of claim 1 wherein said at least one set of cutter members further comprise a set of rigid cutter members.

10. The trimmer head of claim 9 wherein said set of rigid cutter members comprise steel nails.

11. The trimmer head of claim 1 wherein said outer head member has an outer diameter approximately four and one-half inches.

* * * * *